No. 820,128. PATENTED MAY 8, 1906.
M. J. QUINN.
WATER CLOSET.
APPLICATION FILED MAY 4, 1905.
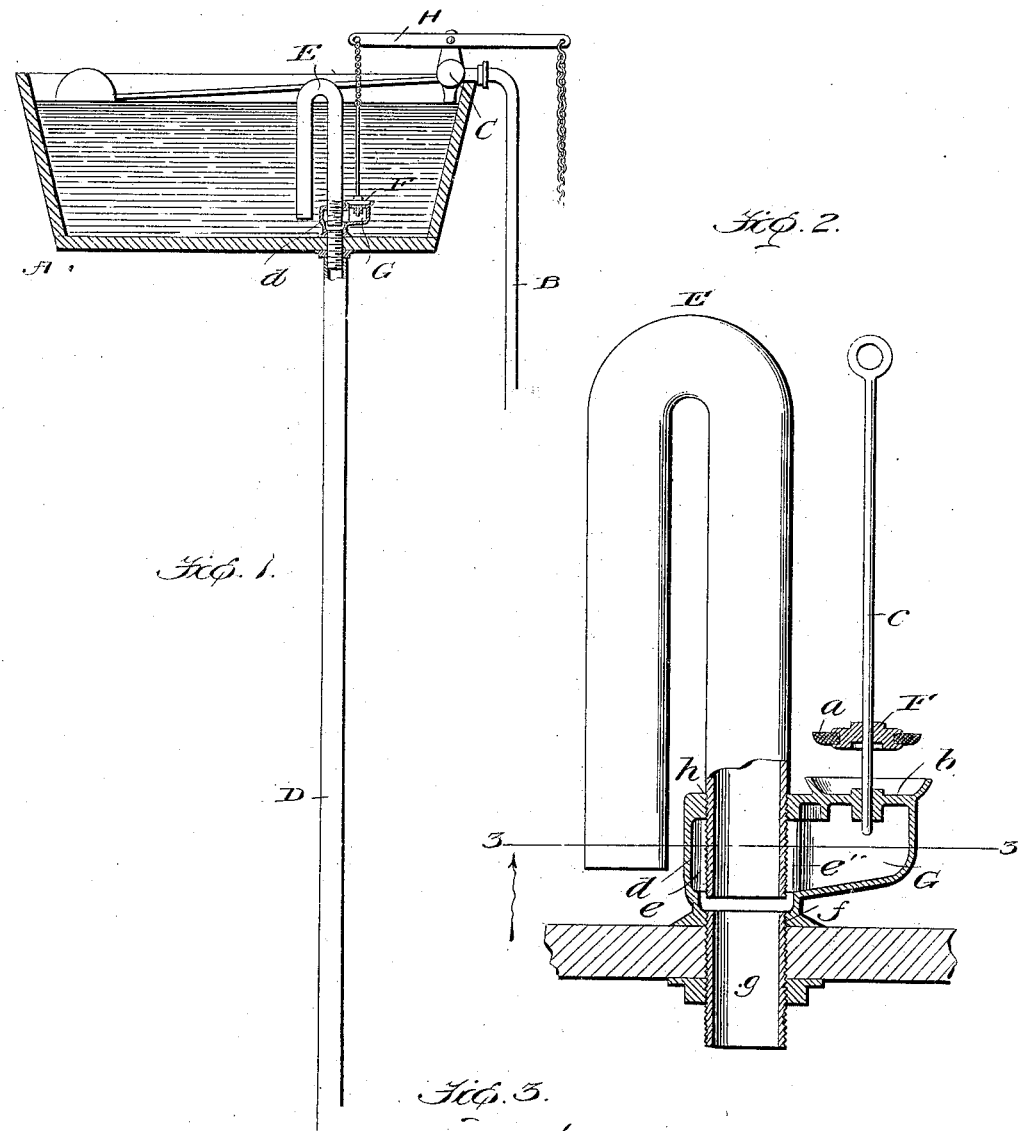

UNITED STATES PATENT OFFICE.

MICHAEL J. QUINN, OF CHICAGO, ILLINOIS.

WATER-CLOSET.

No. 820,128.  Specification of Letters Patent.  Patented May 8, 1906.

Application filed May 4, 1905. Serial No. 258,907.

*To all whom it may concern:*

Be it known that I, MICHAEL J. QUINN, a citizen of the United States, residing at Chicago, in the county of Cook and State of Illinois, have invented new and useful Improvements in Water-Closets, of which the following is a specification.

My invention pertains to water-closets of the type in which a siphon is used to continue the supply to the outlet-pipe of the tank after a valve for initially supplying the said pipe is closed; and it has for its object to provide improved means for initially supplying water from the tank to the outlet-pipe thereof with a view of assuring the prompt flow of a full head of water from the tank through the siphon.

The invention will be fully understood from the following description and claims when taken in connection with the accompanying drawings, forming part of this specification, in which—

Figure 1 is a view, partly in elevation and partly in vertical section, of the flushing-tank of a water-closet equipped with my improvements. Fig. 2 is an enlarged detail view, partly in elevation and partly in vertical section, illustrative of the construction constituting the present and preferred embodiment of my invention and showing the valve for initially supplying the outlet-pipe of the tank as raised; and Fig. 3 is a detail horizontal section taken in the plane indicated by the line 3 3 of Fig. 2 looking upwardly.

Similar letters designate corresponding parts in all of the views of the drawings, referring to which—

A is a flushing-tank which may be a high or low tank, as desired, without involving departure from the scope of my invention, and B is a conduit for supplying the tank A with water. Any suitable means may be employed for controlling communication between the conduit B and the tank A without affecting my invention, although for the sake of clearness I have illustrated the ordinary float-valve C, which is opened when the supply of water in the tank is depleted and closed when the water in the tank reaches a predetermined height.

D is the outlet-pipe of the tank, which is designed to lead therefrom to a bowl. (Not shown.)

E is a siphon, preferably a gooseneck-siphon, which has for its purpose to conduct the major portion of the water in the tank A to the pipe D.

F is the valve for initially supplying the pipe D with water from the tank A, and G is the chamber for conducting the said water from the tank directly into the outlet-pipe D. The said chamber G comprises a valve-seat $a$, disposed at one side of one leg of the siphon E, a spider $b$, disposed below the seat $a$ and designed to guide the stem or rod $c$ of the valve F, and a body portion $d$, which entirely surrounds the lower portion of the mentioned leg of the siphon and is of a size to afford an annular waterway or passage $e$ between its inner side and the outer side of said siphon-leg, as best shown in Figs. 2 and 3 of the drawings. The said chamber G is provided in its lower wall with a threaded aperture $f$ to receive a threaded nipple $g$, which in turn is connected to the pipe D. In the upper wall of said chamber G a threaded aperture $h$ is provided to receive the correspondingly-threaded portion of the siphon-leg, as shown. I desire it understood, however, that I do not confine myself to connecting the chamber G with the pipe D and the siphon-leg in the manner described, inasmuch as the said parts may be joined in any manner compatible with the purpose of my invention without involving a departure from the scope of my invention. The rod or stem $c$ of the valve F is shown in Fig. 1 as connected with one arm of a lever H; but it may obviously be connected to a push-button or any other suitable manipulating device without affecting my invention.

In the practical use of my improvements when it is desired to flush a bowl from the tank A it is simply necessary to raise the valve F from the seat $a$ and then release the said valve. When the valve F is raised, as stated, a small quantity of water will enter the chamber G and rushing around through the way or passage $e$ will completely fill the lower contracted portion $e'$ of the said way or passage, and thereby start the siphon without noise, which is a highly important desideratum. It will also be observed that the siphon and the conduit leading downwardly from the chamber G afford a full waterway and one which will assure a strong and even flush.

Notwithstanding the practical advantages which I have ascribed to my improvements it will be noticed that the said improvements are simple and inexpensive in construction and embody no delicate parts, such as are liable to be deranged or broken after a short period of use.

Having described my invention, what I claim, and desire to secure by Letters Patent, is—

1. In a water-closet, the combination of a flushing-tank, an outlet-pipe, a siphon arranged in the tank with its receiving-leg in direct communication with the interior thereof and its discharge-leg above the outlet-pipe, a chamber connecting the discharge-leg of the siphon and the outlet-pipe and having a water way or passage extending around the discharge end of the siphon and also having an inlet in direct communication with the interior of the tank, a valve controlling the said inlet, and means connected with the said valve through the medium of which the valve may be opened.

2. In a water-closet, the combination of a tank, an outlet-pipe, a siphon arranged to receive from the tank, a chamber connecting one leg of the siphon and the outlet-pipe and having a water way or passage extending around the discharge end of the siphon and provided with a lower contracted portion extending below said end of the siphon and merging into the outlet-pipe and further having an inlet arranged to receive from the tank, and a valve controlling the said inlet.

3. In a water-closet, the combination of a tank, an outlet-pipe, a siphon arranged to receive from the tank, a chamber connecting the siphon and the outlet-pipe and having a water way or passage extending around the discharge end of the siphon and also extending inwardly below said end and merging into the outlet-pipe, and further having an inlet arranged to receive from the tank, and a valve controlling the said inlet.

4. In a water-closet, the combination of a tank, an outlet-pipe, a siphon arranged to receive from the tank, a chamber connecting the siphon and the outlet-pipe and having a water way or passage extending around the discharge portion of the siphon and provided with a lower contracted portion extending inwardly below the lower end of the siphon and merging into the outlet-pipe, and further provided with a valve-seat in its upper side in communication with the interior of the tank, and a valve removably arranged in said seat.

5. In a water-closet, the combination of a tank, a siphon arranged in and adapted to receive from the tank, an outlet-pipe extending downwardly from the tank and arranged below and in alinement with the discharge-leg of the siphon, a chamber connecting the alined siphon-leg and outlet-pipe and having an inlet disposed in the tank in a plane above that of the receiving end of the outlet-pipe and arranged to receive from the tank, a water way or passage extending around the discharge end of the siphon, and a lower contracted portion interposed between said water way or passage and the outlet-pipe.

In testimony whereof I have hereunto set my hand in presence of two subscribing witnesses.

MICHAEL J. QUINN.

Witnesses:
JAMES E. GRIFFENBERG,
GEORGE T. KAY.